(12) United States Patent
Ujihara et al.

(10) Patent No.: US 10,598,110 B2
(45) Date of Patent: Mar. 24, 2020

(54) CONTROL DEVICE FOR ENGINE

(71) Applicant: Mazda Motor Corporation, Aki-gun, Hiroshima (JP)

(72) Inventors: Kenko Ujihara, Higashihiroshima (JP); Hiroaki Shiiba, Aki-gun (JP); Toshiya Kan, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 430 days.

(21) Appl. No.: 15/271,111

(22) Filed: Sep. 20, 2016

(65) Prior Publication Data

US 2017/0089281 A1    Mar. 30, 2017

(30) Foreign Application Priority Data

Sep. 30, 2015    (JP) ................... 2015-194362

(51) Int. Cl.
*F02D 41/10*    (2006.01)
*F02D 37/02*    (2006.01)
(Continued)

(52) U.S. Cl.
CPC ........... *F02D 41/10* (2013.01); *B60W 30/045* (2013.01); *F02D 37/02* (2013.01); *F02D 41/021* (2013.01);
(Continued)

(58) Field of Classification Search
CPC ........ F02D 41/10; F02D 41/021; F02D 37/02; F02D 41/3005; F02D 41/26; F02D 41/38;
(Continued)

(56) References Cited

U.S. PATENT DOCUMENTS 4,933,857 A * 6/1990 Hashiguchi ............... B60L 3/10
180/197
5,163,530 A * 11/1992 Nakamura ............. B60K 28/16
180/197
(Continued)

FOREIGN PATENT DOCUMENTS

JP    2005145143 A  *  6/2005
JP    2005145143 A  *  6/2005
(Continued)

*Primary Examiner* — Sizo B Vilakazi
*Assistant Examiner* — Brian R Kirby
(74) *Attorney, Agent, or Firm* — Alleman Hall Creasman & Tuttle LLP

(57) ABSTRACT

A control device for controlling an engine based on an operating state of a vehicle is provided. The control device includes a processor configured to execute a basic target torque determining module for determining a basic target torque based on an operating state of the vehicle, a torque reduction amount determining module for determining a torque reduction amount based on a part of the operating state of the vehicle, a final target torque determining module for determining a final target torque based on the basic target torque and the torque reduction amount, an engine controlling module for controlling the engine to output the final target torque, and a torque change smoothing module for smoothing a chronological change of the final target torque corresponding to the torque reduction amount at a smaller smoothing degree than that of the chronological change of the final target torque corresponding to the basic target torque.

5 Claims, 6 Drawing Sheets

(51) Int. Cl.
*F02D 41/26* (2006.01)
*F02D 41/30* (2006.01)
*B60W 30/045* (2012.01)
*F02D 41/02* (2006.01)
*F02D 41/00* (2006.01)
*F02D 41/38* (2006.01)

(52) U.S. Cl.
CPC ......... *F02D 41/26* (2013.01); *F02D 41/3005* (2013.01); *F02D 41/0002* (2013.01); *F02D 41/107* (2013.01); *F02D 41/38* (2013.01); *F02D 2041/001* (2013.01); *F02D 2041/0022* (2013.01); *F02D 2200/501* (2013.01); *F02D 2200/60* (2013.01); *F02D 2200/602* (2013.01); *F02D 2250/18* (2013.01)

(58) Field of Classification Search
CPC ............... F02D 41/107; F02D 2200/60; F02D 2250/18; F02D 2200/501; F02D 2200/602; F02D 2041/001; F02D 2041/0022; B60W 30/045
See application file for complete search history.

(56) References Cited

U.S. PATENT DOCUMENTS

| | | | | |
|---|---|---|---|---|
| 5,197,008 A * | 3/1993 | Itoh | ........................ | B60K 28/16 180/197 |
| 5,276,624 A * | 1/1994 | Ito | ........................ | B60K 28/16 180/282 |
| 5,309,362 A * | 5/1994 | Ito | ........................ | B60K 28/16 180/197 |
| 5,379,222 A * | 1/1995 | Anan | ................. | B60G 17/0195 180/197 |
| 6,317,677 B1 * | 11/2001 | Monzaki | ............ | B60K 31/0075 180/421 |
| 6,379,280 B1 * | 4/2002 | Ogawa | .................... | F02D 41/10 123/350 |
| 7,089,104 B2 * | 8/2006 | Post, II | ................. | F02D 41/021 180/197 |
| 7,805,234 B2 * | 9/2010 | Ishimoto | ............... | B60T 8/1755 701/70 |
| 2005/0015191 A1 * | 1/2005 | Banno | .................... | B60T 8/175 701/70 |
| 2007/0289400 A1 * | 12/2007 | Mitchell | ................. | F16H 59/70 74/335 |
| 2008/0133101 A1 * | 6/2008 | Woywod | ............. | B60T 8/17554 701/83 |
| 2009/0093937 A1 * | 4/2009 | Lupo | ..................... | B60W 30/20 701/84 |
| 2009/0112435 A1 * | 4/2009 | Meyers | ................. | B60T 8/1755 701/78 |
| 2009/0182478 A1 * | 7/2009 | Whitney | ................ | B60K 6/365 701/93 |
| 2010/0057283 A1 * | 3/2010 | Worthing | ............ | F02D 41/1497 701/22 |
| 2010/0262348 A1 * | 10/2010 | Nallapa | ............... | B60W 30/188 701/70 |
| 2010/0280738 A1 * | 11/2010 | Whitney | ............... | F02D 11/105 701/102 |
| 2011/0060505 A1 * | 3/2011 | Suzuki | ...................... | B60T 7/12 701/42 |
| 2011/0066338 A1 * | 3/2011 | Andrasko | ............ | F02D 41/021 701/54 |
| 2011/0112740 A1 * | 5/2011 | Hashimoto | ............. | F02D 17/02 701/70 |
| 2011/0178691 A1 * | 7/2011 | Wang | .................. | F02D 41/0002 701/102 |
| 2012/0059567 A1 * | 3/2012 | Seel | ...................... | F02D 11/105 701/102 |
| 2012/0209489 A1 | 8/2012 | Saito et al. | | |
| 2012/0318235 A1 * | 12/2012 | Kaiser | ................... | F02D 11/105 123/350 |
| 2013/0066534 A1 * | 3/2013 | Foussard | .............. | B60K 28/165 701/101 |
| 2014/0045652 A1 * | 2/2014 | Carlson | ................. | B60W 10/06 477/109 |
| 2014/0136074 A1 * | 5/2014 | Wang | .................... | F02D 31/003 701/102 |
| 2015/0112525 A1 * | 4/2015 | Johri | .................... | B60W 10/06 701/22 |
| 2015/0217767 A1 * | 8/2015 | Kelly | ..................... | B60K 28/16 701/93 |
| 2015/0275795 A1 * | 10/2015 | Cygan, Jr. | ........... | F02D 41/0255 701/102 |

FOREIGN PATENT DOCUMENTS

| | | |
|---|---|---|
| JP | 2011088576 A | 5/2011 |
| JP | 2014166014 A | 9/2014 |

* cited by examiner

CONTROL DEVICE FOR ENGINE

BACKGROUND

The present invention relates to a control device for an engine, particularly to a control device which controls an engine based on an operating state of a vehicle.

Conventionally, devices for controlling, when a behavior of a vehicle becomes unstable due to slippage, etc., the behavior of the vehicle toward a safe direction (e.g., sideslip preventing device), are known. Specifically, devices for detecting a behavior, such as understeering or oversteering, in the vehicle when, for example, the vehicle corners, and applying a suitable deceleration to wheels so as to suppress the detected behavior, are known.

On the other hand, as opposed to such a control for improving safety under a traveling state where the vehicle behavior becomes unstable, vehicle operation control devices are known which control a load on front wheels (drive wheels) by adjusting a deceleration when the vehicle corners, so that a series of operations performed by a driver (braking, turning of steering, accelerating, and turning back the steering, etc.) in a normal traveling state of the vehicle becomes natural and stable. For example, JP2011-088576A discloses such a device.

Further, vehicle behavior control devices are known, which reduce a drive force of a vehicle according to a yaw rate related amount (e.g., yaw acceleration) corresponding to a steering operation by a driver, so as to promptly produce a deceleration in the vehicle when the driver starts the steering operation, and promptly apply a sufficient load on front wheels (drive wheels). For example, JP2014-166014A discloses such a device. According to such a vehicle behavior control device, by applying the load on the front wheels when the steering operation is started, a friction force between the front wheels and a road surface increases and a cornering force of the front wheels increases, and therefore, turning performance of the vehicle in a start of entering a curve improves, and responsiveness to a turning operation of the steering improves. Thus, a vehicle behavior intended by the driver is achieved.

Meanwhile, in a vehicle with an internal combustion engine, such as a gasoline engine or a diesel engine, a control device for controlling the engine determines a target torque based on an operating state of the vehicle (e.g., various operations of an accelerator pedal, a brake pedal, a steering, etc. performed by a driver, a traveling environment, such as a vehicle speed, an atmospheric temperature, an atmospheric pressure, a road gradient, a road surface µ, etc.), and controls the engine to output the target torque.

When the target torque is sharply changed, if the engine is controlled to reflect the change of the target torque as it is in an output torque, a sharp acceleration/deceleration is produced in the vehicle and a person on board may feel uncomfortable. Therefore, with the conventional control devices for engines, a chronological change of the target torque is smoothed to reduce the sharp acceleration/deceleration in the vehicle.

On the other hand, with the vehicle behavior control device described in JP2014-166014A, to accurately realize the vehicle behavior intended by the driver, the drive force of the vehicle needs to be reduced promptly in response to the steering operation. However, if the conventional control device for the engine smooths the chronological change of the target torque corresponding to this reduction request of the drive force, a response delay occurs in the drive force control of the vehicle in response to the steering operation by the driver. Therefore, a sufficient increase in the cornering force of the front wheels by the prompt application of the load on the front wheels cannot be achieved, and sufficient responsiveness to the turning operation of the steering cannot be secured. As a result, the vehicle behavior intended by the driver cannot accurately be achieved.

SUMMARY

The present invention is made in view of solving the issues of the conventional arts described above, and aims to provide a control device for an engine, which is capable of controlling the engine to accurately achieve a vehicle behavior intended by a driver while suppressing a sharp change of a target torque.

According to one aspect of the present invention, a control device for controlling an engine based on an operating state of a vehicle is provided. The control device includes a processor configured to execute a basic target torque determining module for determining a basic target torque based on an operating state of the vehicle including an operation of an accelerator pedal (first operating state), a torque reduction amount determining module for determining a torque reduction amount based on a part of the operating state of the vehicle, the part of the operating state excluding the operation of the accelerator pedal (second operating state), a final target torque determining module for determining a final target torque based on the basic target torque and the torque reduction amount, an engine controlling module for controlling the engine to output the final target torque, and a torque change smoothing module for smoothing a chronological change of the final target torque corresponding to the torque reduction amount at a smaller smoothing degree than a smoothing degree of the chronological change of the final target torque corresponding to the basic target torque.

With the above configuration, the torque change smoothing module smooths the chronological change of the final target torque corresponding to the torque reduction amount determined based on the second operating state of the vehicle at the smaller smoothing degree than the smoothing degree of the chronological change of the final target torque corresponding to the basic target torque determined based on the first operating state of the vehicle. Therefore, while a sharp change of the final target torque due to a sharp change of the first operating state is suppressed, the chronological change of the torque reduction amount determined based on the second operating state of the vehicle, without being smoothed excessively, can be reflected in the chronological change of the final target torque. Thus, the engine can be controlled to obtain the torque reduction amount with high responsiveness in the second operating state of the vehicle, a load can promptly be applied to front wheels of the vehicle, and a vehicle behavior intended by a driver can accurately be achieved.

The torque change smoothing module may not smooth the chronological change of the final target torque corresponding to the torque reduction amount.

With the above configuration, while the sharp change of the final target torque due to the sharp change of the first operating state of the vehicle is suppressed, the chronological change of the torque reduction amount determined based on the second operating state of the vehicle can be reflected in the chronological change of the final target torque as it is. Therefore, by controlling the engine to obtain the torque reduction amount with highest responsiveness to the second operating state of the vehicle, the vehicle behavior intended by the driver can accurately be achieved.

The torque reduction amount determining module may determine the torque reduction amount according to a steering operation of the vehicle.

With the above configuration, the chronological change of the torque reduction amount determined based on the steering operation, without being smoothed excessively, can be reflected in the chronological change of the final target torque. Therefore, by promptly applying a deceleration corresponding to the steering operation by the driver on the vehicle to add the load on the front wheels so as to promptly increase a cornering force, the responsiveness to the steering operation can be improved. Moreover, while the sharp change of the final target torque corresponding to the first operating state of the vehicle is suppressed, the engine can be controlled to accurately achieve the vehicle behavior intended by the driver.

The torque reduction amount determining module may determine the torque reduction amount to be increased while an increase rate thereof becomes lower, as a steering speed of the vehicle increases.

With the above configuration, once the steering operation of the vehicle is started and the steering speed of the vehicle starts to increase, the torque reduction amount can promptly be increased accordingly. Thus, the deceleration is promptly applied to the vehicle when the steering operation of the vehicle is started, and a sufficient load can promptly be applied to the front wheels which are drive wheels of the vehicle, which increases a friction force between the front wheels and a road surface and increases the cornering force of the front wheels. As a result, a turning performance of the vehicle in the start of entering a curve improves, and responsiveness to the turning operation of the steering improves while suppressing the sharp change of the final target torque corresponding to the first operating state of the vehicle.

The basic target torque determining module may determine a target acceleration of the vehicle based on the operating state of the vehicle including the operation of the accelerator pedal, and determine the basic target torque based on the target acceleration.

With the above configuration, the basic target torque is determined based on the target acceleration. Therefore, the engine can be controlled to accurately achieve acceleration intended by the driver while suppressing the sharp change of the final target torque corresponding to the first operating state of the vehicle.

The engine may be a diesel engine including a fuel injector for injecting fuel into a cylinder. The engine controlling module may control a fuel injection amount of the fuel injector so as to cause the diesel engine to output the final target torque.

With the above configuration, the fuel injection amount of the diesel engine is controlled according to the final target torque. Thus, the chronological change of the torque reduction amount determined based on the second operating state of the vehicle can accurately be achieved with high responsiveness, and the engine can be controlled to accurately achieve the vehicle behavior intended by the driver.

The engine may be a gasoline engine including an air amount controlling mechanism for controlling an amount of air introduced into a cylinder, and an ignitor for igniting mixture gas within the cylinder. The air amount controlling mechanism may be a throttle valve actuator or a variable valve mechanism. The engine controlling module may control at least one of the air amount by the air amount controlling mechanism and an ignition timing by the ignitor, so as to cause the gasoline engine to output the final target torque.

With the above configuration, the at least one of the air amount introduced into the cylinder of the gasoline engine and the ignition timing is changed according to the final target torque. Thus, the chronological change of the torque reduction amount determined based on the second operating state of the vehicle can accurately be achieved with high responsiveness, and the engine can be controlled to accurately achieve the vehicle behavior intended by the driver.

DETAILED DESCRIPTION OF EMBODIMENT

Hereinafter, a control device for an engine according to one embodiment of the present invention is described with reference to the appended drawings.

<System Configuration>

First, an engine system to which the control device for the engine according to this embodiment is applied is described with reference to FIG. 1 which is a schematic configuration view of the engine system to which the control device for the engine according to this embodiment is applied.

Figure 1:
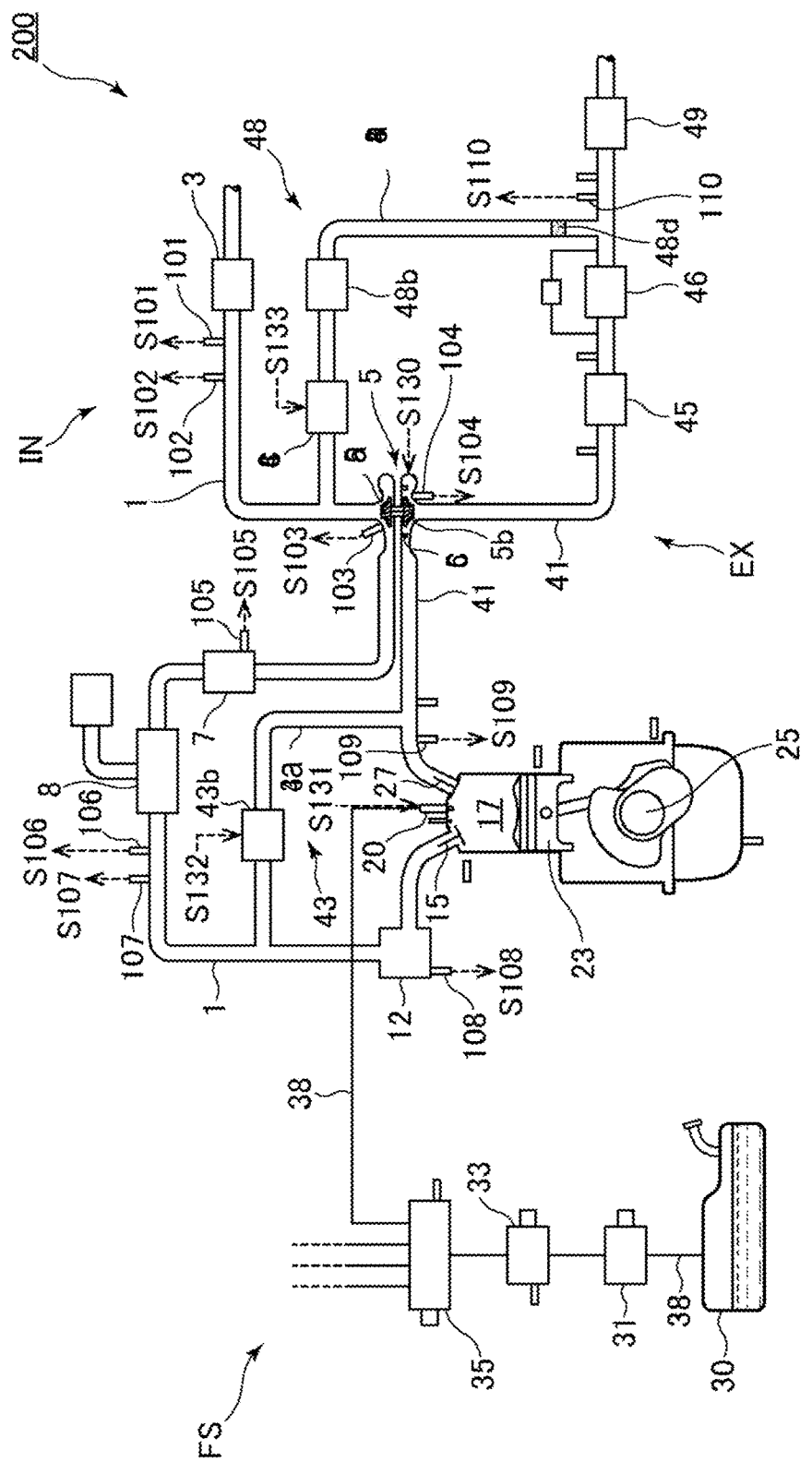
FIG. 1 is a schematic configuration view of an engine system to which a control device for an engine according to one embodiment of the present invention is applied.

As illustrated in FIG. 1, the engine system 200 mainly includes an engine E as a diesel engine, an intake system IN for supplying intake air to the engine E, a fuel supply system FS for supplying fuel to the engine E, an exhaust system EX for discharging exhaust gas of the engine E, sensors 96 to 110 for detecting various states regarding the engine system 200, and a Power-train Control Module (PCM) 60 for controlling the engine system 200.

The intake system IN includes an intake passage 1 through which the intake air passes. The intake passage 1 is provided with, from its upstream side in the following order, an air cleaner 3 for purifying air introduced externally, a compressor 5a provided to a turbocharger 5 and for compressing the intake air passing therethrough to increase an intake air pressure, an intake shutter valve 7 for adjusting a flow rate of the intake air passing therethrough, a water-cool-type intercooler 8 for cooling the intake air by using a coolant therein, and a surge tank 12 for temporarily storing the intake air to be supplied to the engine E.

Further in the intake system IN, an airflow sensor 101 for detecting an amount of the intake air and an intake air temperature sensor 102 for detecting an intake air temperature are provided to the intake passage 1 immediately downstream of the air cleaner 3, a turbo-speed sensor 103 for detecting a rotational speed of the compressor 5a of the turbocharger 5 (turbo-speed) is provided to the compressor 5a, an intake shutter valve position sensor 105 for detecting an opening of the intake shutter valve 7 is provided to the intake shutter valve 7, an intake air temperature sensor 106 for detecting an intake air temperature and an intake air pressure sensor 107 for detecting the intake air pressure are provided to the intake passage 1 immediately downstream of the intercooler 8, and an intake manifold temperature sensor 108 is provided to the surge tank 12. The various sensors 101 to 103 and 105 to 108 provided in the intake system IN output to the PCM 60 detection signals S101 to S103 and S105 to S108 corresponding to the detected parameters.

The engine E includes an intake valve 15 for introducing the intake air supplied from the intake passage 1 (specifically, intake manifold) into a combustion chamber 17, a fuel injector 20 for injecting the fuel to the combustion chamber 17, a piston 23 for reciprocating due to combustion of mixture gas within the combustion chamber 17, a crankshaft 25 for rotating in conjunction with the reciprocation of the piston 23, and an exhaust valve 27 for discharging, to an exhaust passage 41, the exhaust gas produced by the combustion of the mixture gas within the combustion chamber 17.

The fuel supply system FS includes a fuel tank 30 for storing the fuel and a fuel supply passage 38 for supplying the fuel from the fuel tank 30 to the fuel injector 20. The fuel supply passage 38 is provided with, from its upstream side in the following order, a low-pressure fuel pump 31, a high-pressure fuel pump 33, and a common rail 35.

The exhaust system EX includes the exhaust passage 41 through which the exhaust gas passes. The exhaust passage 41 is provided with, from its upstream side in the following order, a turbine 5b provided to the turbocharger 5 and for rotating with the exhaust gas passing therethrough and driving the compressor 5a as described above with the rotation, a diesel oxidation catalyst (DOC) 45 and a diesel particulate filter (DPF) 46 that have a purifying function of the exhaust gas, and an exhaust shutter valve 49 for adjusting a flow rate of the exhaust gas passing therethrough. The DOC 45 is a catalyst for oxidizing hydrocarbons (HC), carbon monoxide (CO), etc. by using oxygen within the exhaust gas, to convert them into water and carbon dioxide. The DPF 46 traps particulate matter (PM) within the exhaust gas.

Further in the exhaust system EX, an exhaust gas pressure sensor 109 for detecting an exhaust gas pressure is provided to the exhaust passage 41 upstream of the turbine 5b of the turbocharger 5, and a linear $O_2$ sensor 110 for detecting an oxygen concentration is provided to the exhaust passage 41 immediately downstream of the DPF 46. These sensors 109 and 110 provided in the exhaust system EX output to the PCM 60 detection signals S109 and S110 corresponding to the detected parameters.

Moreover in this embodiment, the turbocharger 5 has a compact structure so as to be able to efficiently perform the turbocharging even when rotating at a low speed (i.e., exhaust energy is low). Also, the turbocharger 5 is configured as a variable geometry turbocharger (VGT) provided with a plurality of movable flaps 5c to surround an entire circumference of the turbine 5b, and for varying with the flaps 5c a channel cross-sectional area for the exhaust gas to flow to the turbine 5b (nozzle cross-sectional area). For example, the flaps 5c are adjusted in magnitude of negative pressure to act on a diaphragm by an electromagnetic valve, and turned by an actuator. Further, a VGT opening sensor 104 for detecting an opening of each flap 5c (corresponding to a flap opening, hereinafter, suitably referred to as "the VGT opening") based on a position of the actuator is provided. The VGT opening sensor 104 outputs to the PCM 60 a detection signal S104 corresponding to the detected VGT opening.

The engine system 200 of this embodiment further includes a high-pressure EGR device 43 and a low-pressure EGR device 48. The high-pressure EGR device 43 has a high-pressure EGR passage 43a connecting the exhaust passage 41 upstream of the turbine 5b of the turbocharger 5 and the intake passage 1 downstream of the compressor 5a of the turbocharger 5 (specifically, downstream of the intercooler 8), and a high-pressure EGR valve 43b for adjusting a flow rate of the exhaust gas passing through the high-pressure EGR passage 43a. The low-pressure EGR device 48 has a low-pressure EGR passage 48a connecting the exhaust passage 41 downstream of the turbine 5b of the turbocharger 5 (specifically, downstream of the DPF 46 and upstream of the exhaust shutter valve 49) and the intake passage 1 upstream of the compressor 5a of the turbocharger 5, a low-pressure EGR cooler 48b for cooling the exhaust gas passing through the low-pressure EGR passage 48a, a low-pressure EGR valve 48c for adjusting a flow rate of the exhaust gas passing through the low-pressure EGR passage 48a, and a low-pressure EGR filter 48d.

The exhaust gas amount recirculated to the intake system IN by the high-pressure EGR device 43 (hereinafter, referred to as "the high-pressure EGR gas amount") is substantially determined based on the exhaust gas pressure at the upstream of the turbine 5b of the turbocharger 5, an intake air pressure produced based on the opening of the intake shutter valve 7, and an opening of the high-pressure EGR valve 43b. Further, the exhaust gas amount recirculated to the intake system IN by the low-pressure EGR device 48 (hereinafter, referred to as "the low-pressure EGR gas amount") is substantially determined based on an intake air pressure at the upstream of the compressor 5a of the turbocharger 5, an exhaust gas pressure produced based on an opening of the exhaust shutter valve 49, and an opening of the low-pressure EGR valve 48c.

Figure 2:
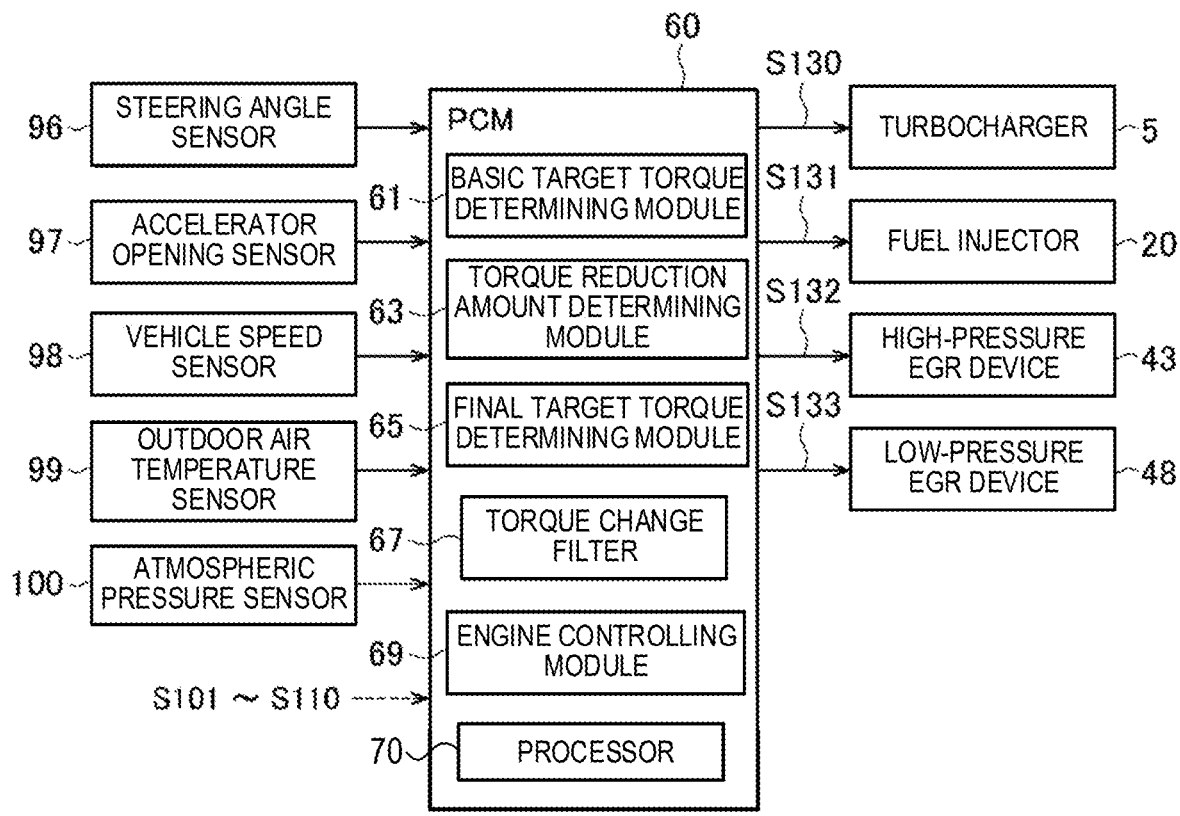
FIG. 2 is a block diagram illustrating an electric configuration of the control device for the engine.

Next, an electric configuration of the control device for the engine according to this embodiment is described with reference to FIG. 2 which is a block diagram illustrating this electric configuration of the control device for the engine. The control device includes several program modules, which are software stored in non-volatile memory or firmware.

The PCM 60 (the control device for the engine) of this embodiment outputs control signals S130 to S133 to control the turbocharger 5, the fuel injector 20, the high-pressure EGR device 43, and the low-pressure EGR device 48, based on detection signals S96 to S100 outputted by a steering angle sensor 96 for detecting a rotational angle of a steering wheel, an accelerator opening sensor 97 for detecting a position of an accelerator pedal (accelerator opening), a vehicle speed sensor 98 for detecting a vehicle speed, an outdoor air temperature sensor 99 for detecting an outdoor air temperature, and an atmospheric pressure sensor 100 for detecting an atmospheric pressure, respectively, in addition to the detection signals S101 to S110 from the various sensors 101 to 110 described above.

The PCM 60 includes a basic target torque determining module 61 for determining a basic target torque based on a first operating state of the vehicle including an operation of the accelerator pedal (hereinafter, simply referred to as "the first operating state of the vehicle"), a torque reduction amount determining module 63 for determining a torque reduction amount based on a second operating state of the vehicle excluding the operation of the accelerator pedal (hereinafter, simply referred to as "the second operating state of the vehicle"), a final target torque determining module 65 for determining a final target torque based on the basic target torque and the torque reduction amount, a torque change filter 67 (torque change smoothing module) for smoothing a chronological change of the final target torque, an engine controlling module 69 for controlling the engine E to output the final target torque, and a processor 70 for executing the various modules of the PCM 60.

These various components of the PCM 60 are comprised of a computer including the processor 70, various programs (including a base control program, such as an OS, and an application program which is activated on the OS and achieves a particular function) which are interpreted and executed on the processor 70, and internal memories, such as a ROM and a RAM, for storing the programs and various data.

Next, processing performed by the control device for the engine is described with reference to FIGS. 3 to 5.

Figure 3:
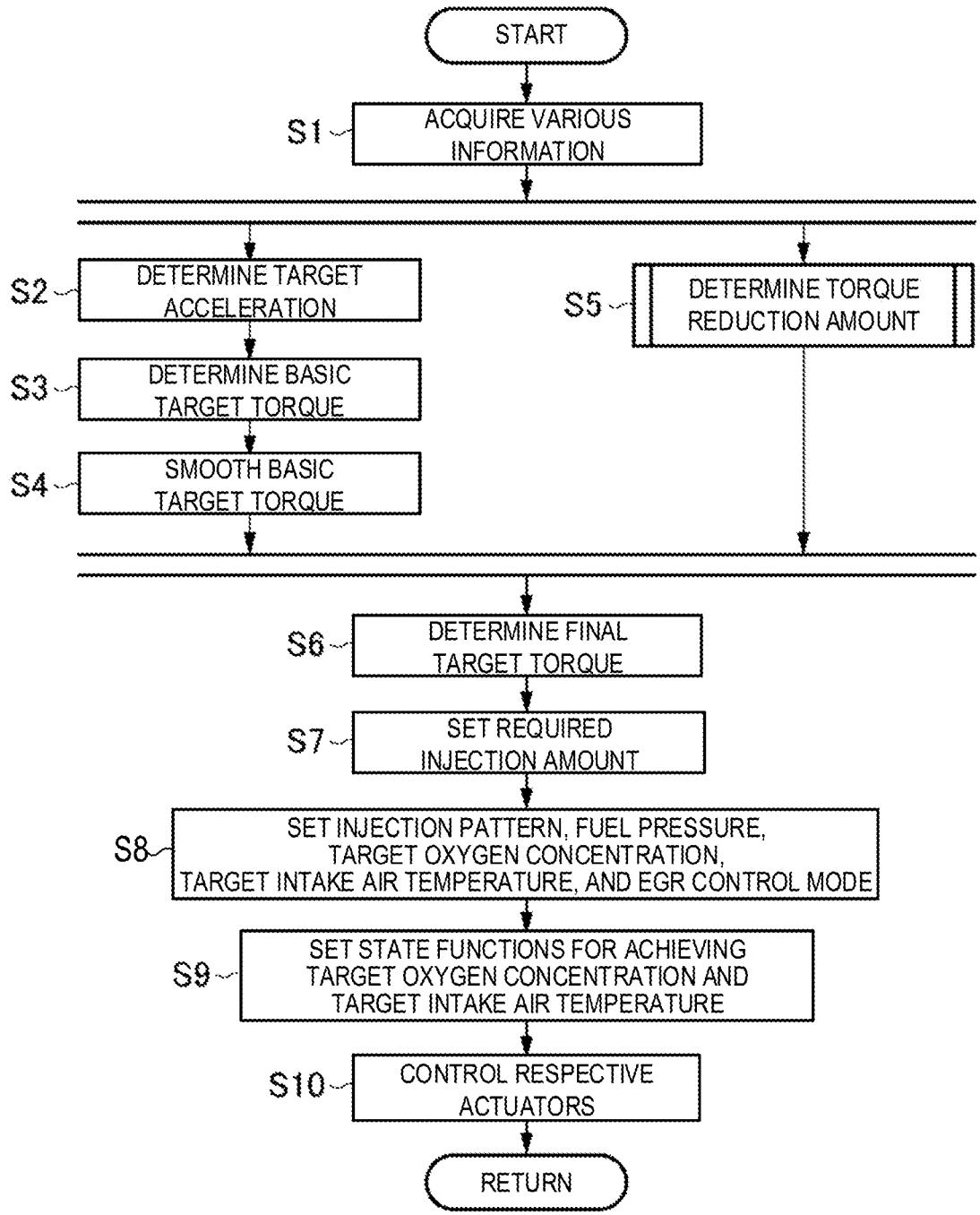
FIG. 3 is a flowchart of engine control processing performed by the control device for the engine.

FIG. 3 is a flowchart of engine control processing performed by the control device for the engine E. FIG. 4 is a flowchart of torque reduction amount determination processing performed by the control device for the engine. FIG. 5 is a map illustrating a relationship between a target applied deceleration and a steering speed determined by the control device for the engine.

The engine control processing of FIG. 3 is activated when an ignition switch of the vehicle is switched on and a power of the control device for the engine is turned on, and is repeatedly performed.

Once the engine control processing is started, as illustrated in FIG. 3, at S1, the PCM 60 acquires the operating state of the vehicle. Specifically, the PCM 60 acquires the detection signals S96 to S110 outputted by the various sensors 96 to 110 described above, etc., including the steering angle detected by the steering angle sensor 96, the accelerator opening detected by the accelerator opening sensor 97, the vehicle speed detected by the vehicle speed sensor 98, and a gear position currently set in a transmission of the vehicle, as the operating state of the vehicle.

Next, at S2, the basic target torque determining module 61 of the PCM 60 sets a target acceleration based on the first operating state of the vehicle acquired at S1. Specifically, the basic target torque determining module 61 selects from acceleration characteristics maps defined for various vehicle speeds and gear positions (designed and stored beforehand in, for example, a memory), an acceleration characteristics map corresponding to the current vehicle speed and the current gear position, and determines the target acceleration corresponding to a current accelerator opening by referring to the selected acceleration characteristics map.

Next, at S3, the basic target torque determining module 61 determines a basic target torque of the engine E for achieving the target acceleration determined at S2. Here, the basic target torque determining module 61 determines the basic target torque based on the current vehicle speed, the current gear position, a road gradient, a road surface μ, etc., within a range of torque which the engine E is able to output.

Next, at S4, the torque change filter 67 smooths a chronological change of the basic target torque determined at S3. The method of the smoothing may specifically be any of various well-known methods (e.g., limiting a change ratio of the basic target torque to a threshold or below, calculating a variation average of the chronological change of the basic target torque, etc.).

Further, in parallel to the processes at S2 to S4, at S5, the torque reduction amount determining module 63 performs the torque reduction amount determination processing for determining the torque reduction amount based on the second operating state of the vehicle. The torque reduction amount determination processing is described with reference to FIG. 4.

Figure 4:
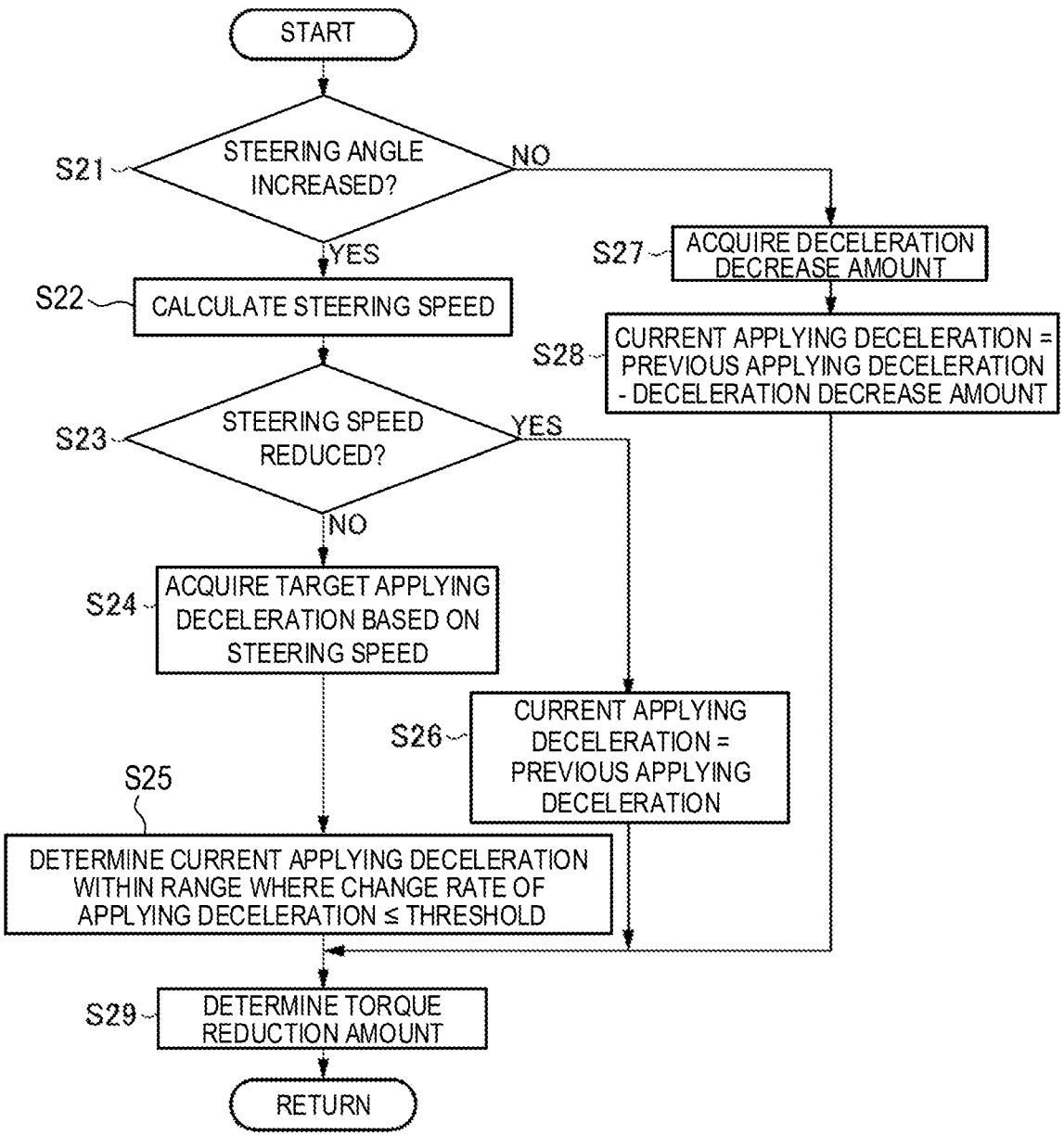
FIG. 4 is a flowchart of torque reduction amount determination processing performed by the control device for the engine.

As illustrated in FIG. 4, once the torque reduction amount determination processing is started, at S21, the torque reduction amount determining module 63 determines whether an absolute value of the steering angle acquired at S1 increases. If the absolute value of the steering angle increases as a result, the processing proceeds to S22 where the torque reduction amount determining module 63 calculates the steering speed based on the steering angle acquired at S1.

Next, at S23, the torque reduction amount determining module 63 determines whether an absolute value of the steering speed reduces.

If the absolute value of the steering speed does not reduce, in other words, the absolute value of the steering speed neither reduces nor changes, the processing proceeds to S24 where the torque reduction amount determining module 63 acquires a target applied deceleration based on the steering speed. The target applied deceleration is a deceleration to be applied to the vehicle in response to a steering operation in order to accurately achieve a behavior of the vehicle intended by a driver.

Figure 5:
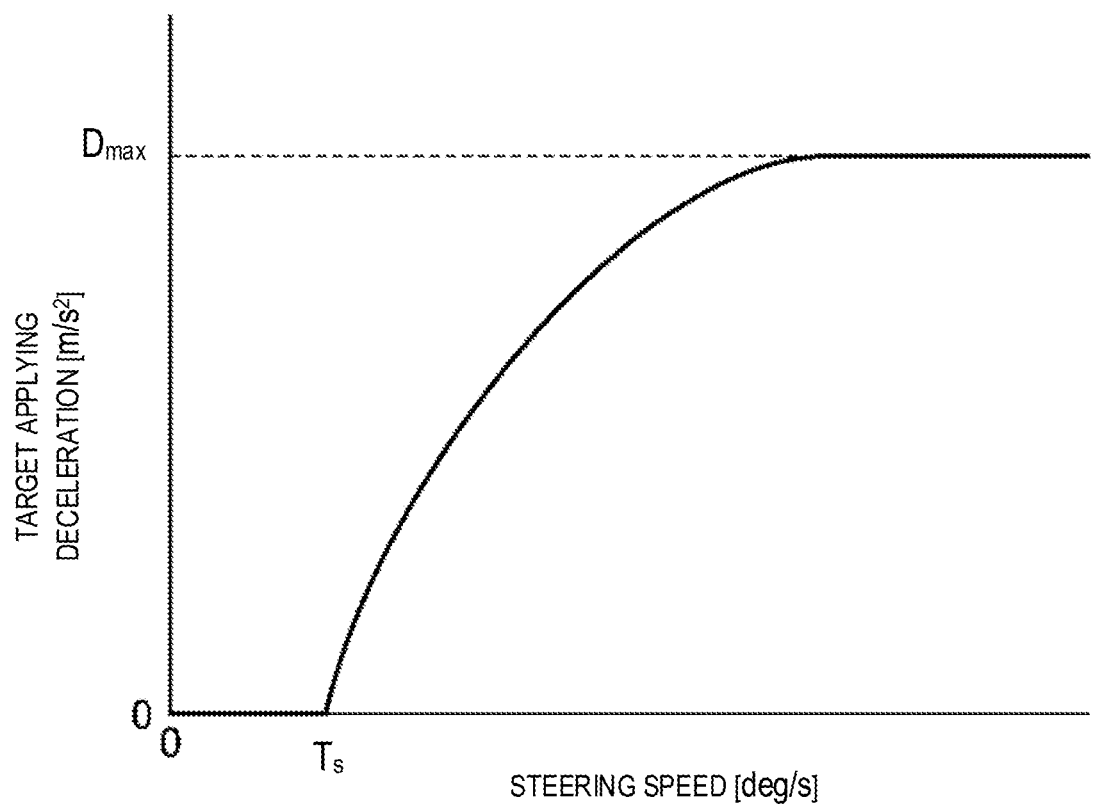
FIG. 5 is a map illustrating a relationship between a target applied deceleration and a steering speed determined by the control device for the engine.

Specifically, the torque reduction amount determining module 63 acquires the target applied deceleration corresponding to the steering speed calculated at S22, based on a relationship between the target applied deceleration and the steering speed illustrated on the map of FIG. 5.

In FIG. 5, the horizontal axis indicates the steering speed and the vertical axis indicates the target applied deceleration. As illustrated in FIG. 5, in a case where the steering speed is below a threshold $T_s$ (e.g., 10 deg/s), the target applied deceleration corresponding thereto is zero (0). Specifically, if the steering speed is below the threshold $T_s$, the deceleration is not applied to the vehicle in response to the steering operation.

On the other hand, if the steering speed is the threshold $T_s$ or above, the target applied deceleration corresponding thereto gradually approaches a given upper limit value $D_{max}$ (e.g., 1 m/s²) as the steering speed increases. Specifically, the target applied deceleration increases at an increase rate which becomes lower as the steering speed increases.

Next, at S25, the torque reduction amount determining module 63 determines an applied deceleration for the current processing (hereinafter, referred to as "the current applied deceleration") within a range where an increase rate of the applied deceleration is a threshold Rmax (e.g., 0.5 m/s³) or below.

Specifically, the torque reduction amount determining module 63, if the increase rate from the applied deceleration determined in previous processing (hereinafter, referred to as "the previous applied deceleration") to the target applied deceleration determined at S24 in the current processing (hereinafter, referred to as "the current target applied deceleration") is Rmax or below, determines the current target applied deceleration to be the current applied deceleration.

On the other hand, if the change rate from the previous applied deceleration to the current target applied deceleration is higher than Rmax, the torque reduction amount determining module 63 determines a value obtained by increasing from the previous applied deceleration until the current processing at the increase rate Rmax, to be the current applied deceleration.

Further at S23, if the absolute value of the steering speed reduces, the processing proceeds to S26 where the torque reduction amount determining module 63 determines the previous applied deceleration to be the current applied deceleration. Specifically, if the absolute value of the steering speed reduces, the applied deceleration when the steering speed is at its highest value (i.e., a highest value of the applied deceleration) is maintained.

Moreover at S21, if the absolute value of the steering angle does not increase (is fixed or reduces), the processing proceeds to S27 where the torque reduction amount determining module 63 acquires an amount to reduce in the current processing, from the previous applied deceleration (deceleration decrease amount). This deceleration decrease amount is calculated based on a certain decrease rate (e.g., 0.3 m/s³) stored in, for example, a memory, beforehand. Alternatively, the deceleration decrease amount is calculated based on the first/second operating state of the vehicle acquired at S1 and/or the decrease rate determined corresponding to the steering speed calculated at S22.

Then at S28, the torque reduction amount determining module 63 determines the current applied deceleration by subtracting from the previous applied deceleration, the deceleration decrease amount acquired at S27.

After S25, S26, or S28, at S29, the torque reduction amount determining module 63 determines the torque reduction amount based on the current applied deceleration determined at S25, S26, or S28. Specifically, the torque reduction amount determining module 63 determines the torque reduction amount required for achieving the current applied deceleration, based on the current vehicle speed, the current gear position, the current road gradient, etc. acquired at S1. After S29, the torque reduction amount determining module 63 terminates the torque reduction amount determination processing and returns to the main routine.

Returning to FIG. 3, after the processes at S2 to S4 and the torque reduction amount determination processing at S5, at S6, the final target torque determining module 65 determines the final target torque by subtracting from the basic target torque after smoothing at S4, the torque reduction amount determined in the torque reduction amount determination processing at S5.

Next, at S7, the engine controlling module 69 sets a required injection amount to be injected from the fuel injector 20 based on the final target torque determined at S6 and an engine speed.

Next, at S8, the engine controlling module 69 sets an injection pattern of the fuel, a fuel pressure, a target oxygen concentration, a target intake air temperature, and an Exhaust Gas Recirculation (EGR) control mode (a mode in which at least one of the high-pressure and low-pressure EGR devices 43 and 48 is activated or a mode in which neither of the high-pressure and low-pressure EGR devices 43 and 48 is activated), based on the required injection amount set at S7, and the engine speed.

Next, at S9, the engine controlling module 69 sets state functions for achieving the target oxygen concentration and the target intake air temperature which are set at S8. For example, the state functions include the amount of exhaust gas to be recirculated to the intake system IN by the high-pressure EGR device 43 (high-pressure EGR gas amount), the amount of exhaust gas to be recirculated to the intake system IN by the low-pressure EGR device 48 (low-pressure EGR gas amount), and a turbocharging pressure produced by the turbocharger 5.

Then at S10, the engine controlling module 69 controls various actuators for driving the respective components of the engine system 200, based on the state functions set at S9. Here, the engine controlling module 69 performs the control by setting limit values and limit ranges corresponding to the state functions, and setting control amounts of the respective actuators so that the state functions follow the limitation based on the limit values and ranges.

After S10, the PCM 60 terminates the engine control processing.

Next, the operation of the control device for the engine according to this embodiment is described with reference to FIG. 6 which shows diagrams illustrating chronological changes of parameters regarding the engine control performed by the control device for the engine in a case where the vehicle on which the control device for the engine is mounted turns.

Figure 6:
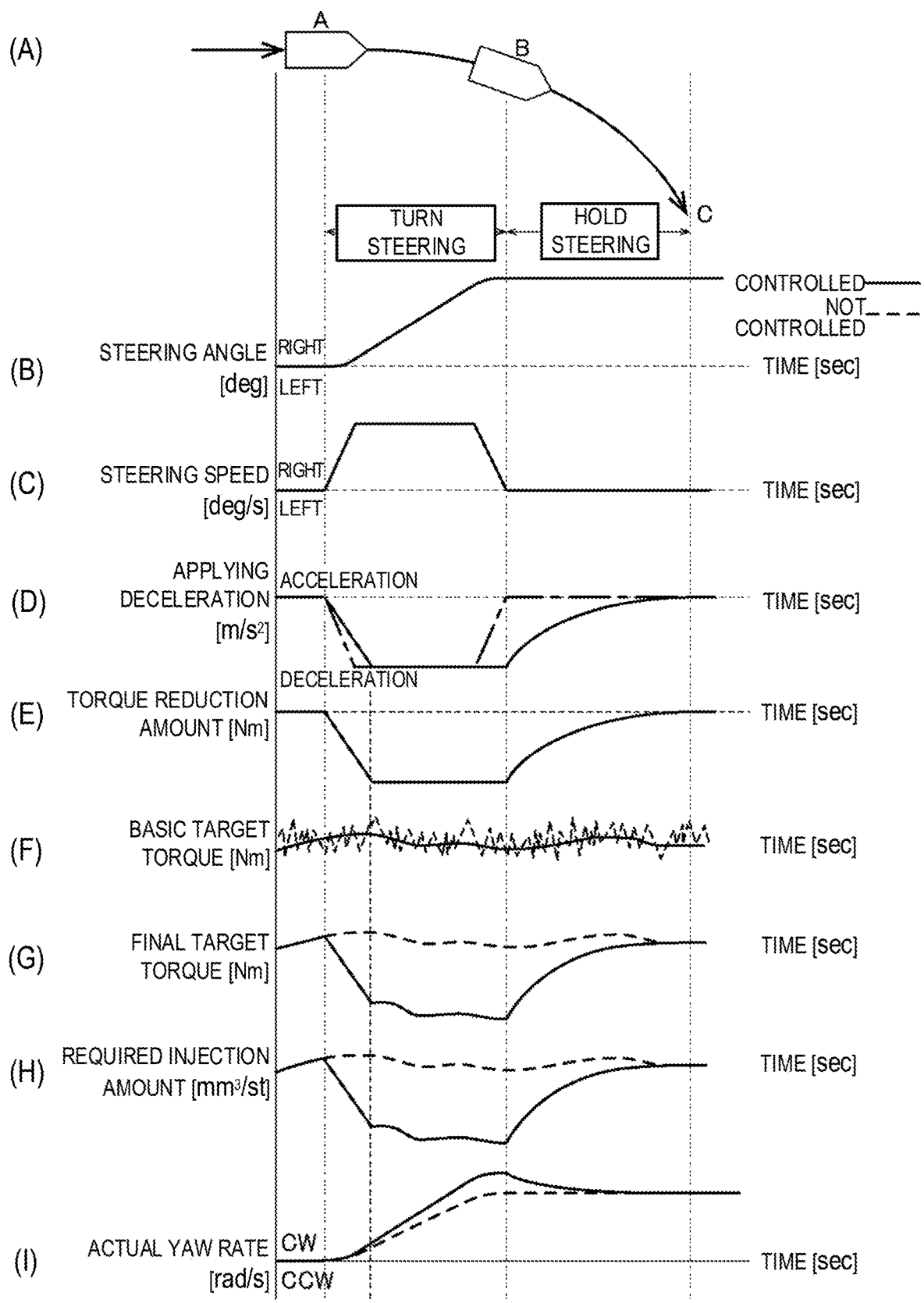
FIG. 6 shows diagrams illustrating chronological changes of parameters regarding the engine control processing performed by the control device for the engine in a case where a vehicle on which the control device for the engine is mounted turns, in which Part (A) is a plan view schematically illustrating the vehicle turning rightward, Part (B) is a chart illustrating a change of a steering angle of the vehicle turning rightward as illustrated in Part (A), Part (C) is a chart illustrating a change of a steering speed of the vehicle turning rightward as illustrated in Part (B), Part (D) is a chart illustrating a change of an applied deceleration determined based on the steering speed illustrated in Part (C), Part (E) is a chart illustrating a change of a torque reduction amount determined based on the applied deceleration illustrated in Part (D), Part (F) is a chart illustrating a change of a basic target torque around a timing of smoothing by a torque change filter, Part (G) is a chart illustrating a change of a final target torque determined based on the basic target torque and the torque reduction amount, Part (H) is a chart illustrating a change of a fuel injection amount determined based on the final target torque, and Part (I) is a chart illustrating a change of a yaw rate (actual yaw rate) which occurs in the vehicle when the fuel injection amount is controlled as illustrated in Part (H), and a change of the actual yaw rate when the fuel injection amount is not controlled based on the torque reduction amount determined by a torque reduction amount determining module.

Part (A) of FIG. 6 is a plan view schematically illustrating the vehicle turning rightward. As illustrated in Part (A) of FIG. 6, the vehicle starts turning rightward from a position A, and continues to turn rightward at a fixed steering angle from a position B to a position C.

Part (B) of FIG. 6 is a chart illustrating a change of the steering angle of the vehicle turning rightward as illustrated in Part (A). In Part (B), a horizontal axis indicates time and a vertical axis indicates the steering angle.

As illustrated in Part (B) of FIG. 6, the rightward steering operation is started at the position A, the rightward steering angle gradually increases as the steering is turned more, and the rightward steering angle reaches its largest angle at the position B. Then, the steering angle is fixed until reaching the position C (hold the steering).

Part (C) of FIG. 6 is a chart illustrating a change of the steering speed of the vehicle turning rightward as illustrated in Part (B). In Part (C), a horizontal axis indicates time and a vertical axis indicates the steering speed.

The steering speed of the vehicle is expressed by time derivative of the steering angle of the vehicle. Specifically, as illustrated in Part (C) of FIG. 6, when the rightward steering operation is started at the position A, a rightward steering speed is produced and the steering speed is substantially fixed between the positions A and B. Then, the rightward steering speed decreases and, once the rightward steering angle reaches its largest angle at the position B, the steering speed becomes zero (0). Further, while the rightward steering angle is maintained from the position B to the position C, the steering speed remains zero.

Part (D) of FIG. 6 is a chart illustrating a change of the applied deceleration determined based on the steering speed illustrated in Part (C). In Part (D), a horizontal axis indicates time and a vertical axis indicates the applied deceleration. Further in Part (D), a solid line indicates a change of the applied deceleration determined in the torque reduction amount determination processing in FIG. 4, and a one-dotted chain line indicates a change of the target applied deceleration based on the steering speed. The target applied deceleration indicated by the one-dotted chain line, similarly to the change of the steering speed illustrated in Part (C) of FIG. 6, starts increasing at the position A, is substantially fixed between the positions A and B, and then decreases until it becomes zero at the position B.

As is described with reference to FIG. 4, the torque reduction amount determining module 63 acquires the target applied deceleration based on the steering speed at S24 if the absolute value of the steering speed does not reduce, in other words, the absolute value of the steering speed does not increase or change, as a result of S23. Next, at S25, the torque reduction amount determining module 63 determines the applied deceleration in each processing cycle within a range where the increase rate of the applied deceleration is the threshold Rmax or below.

Part (D) of FIG. 6 illustrates a case where the increase rate of the target applied deceleration which starts increasing at the position A, exceeds the threshold Rmax. In this case, the torque reduction amount determining module 63 increases the applied deceleration to achieve the increase rate=Rmax (i.e., the increase rate gentler than the target applied deceleration indicated by the one-dotted chain line). Further, when the target applied deceleration is substantially fixed between the positions A and B, the torque reduction amount determining module 63 determines that the applied deceleration=the target applied deceleration.

Moreover, as described above, if the absolute value of the steering speed reduces at S23 of FIG. 4, the torque reduction amount determining module 63 maintains the applied deceleration when the steering speed is at its highest value. In Part (D) of FIG. 6, when the steering speed decreases toward the position B, the target applied deceleration indicated by the one-dotted chain line also decreases accordingly, whereas the applied deceleration indicated by the solid line is maintained at its highest value until reaching the position B.

Further as described above, if the absolute value of the steering angle is fixed or reduces at S21 of FIG. 4, the torque reduction amount determining module 63 acquires the deceleration decrease amount at S27 and reduces the applied deceleration based on the deceleration decrease amount. In Part (D) of FIG. 6, the torque reduction amount determining module 63 decreases the applied deceleration so that the decrease rate of the applied deceleration becomes gradually lower, in other words, an inclination of the solid line indicating the change of the applied deceleration gradually becomes gentler.

Part (E) of FIG. 6 is a chart illustrating a change of the torque reduction amount determined based on the applied deceleration illustrated in Part (D). In Part (E), a horizontal axis indicates time and a vertical axis indicates the torque reduction amount.

As described above, the torque reduction amount determining module 63 determines the torque reduction amount which is required for achieving the applied deceleration, based on the parameters, such as the current vehicle speed, the current gear position, and the current road gradient. Therefore, if these parameters are steady, the torque reduction amount is determined to change similarly to the change of the applied deceleration illustrated in Part (D) of FIG. 6.

Part (F) of FIG. 6 is a chart illustrating a change of the basic target torque around a timing of smoothing by the torque change filter 67. In Part (F), a horizontal axis indicates time and a vertical axis indicates torque. Further in Part (F), a dashed line indicates a basic target torque before the smoothing by the torque change filter 67 and a solid line indicates a basic target torque after the smoothing by the torque change filter 67.

As indicated by the dashed line in Part (F), the basic target torque determined to achieve the target acceleration set based on the accelerator opening, the vehicle speed, the gear position, etc. may sharply vary due to various disturbances, noises, etc. By smoothing the basic target torque with the torque change filter 67, the sharp variation indicated by the solid line of Part (F) is suppressed and a sharp acceleration of the vehicle is suppressed.

Part (G) of FIG. 6 is a chart illustrating a change of the final target torque determined based on the basic target torque and the torque reduction amount. In Part (G), a horizontal axis indicates time and a vertical axis indicates torque. Further in Part (G), a dashed line indicates the smoothed basic target torque illustrated in Part (F) and a solid line indicates the final target torque.

As is described with reference to FIG. 3, the final target torque determining module 65 determines the final target torque by subtracting the torque reduction amount determined in the torque reduction amount determination processing performed at S5, from the basic target torque after smoothing at S4. Between the basic target torque and the torque reduction amount used for determining the final target torque, the torque change filter 67 only smooths the basic target torque determined based on the first operating state of the vehicle. In other words, in the chronological change of the final target torque, the chronological change corresponding to the torque reduction amount determined based on the steering operation which is the second operating state is not smoothed by the torque change filter 67. Therefore, as indicated by the solid line of Part (G) of FIG. 6, the torque reduction amount is reflected in the final target torque as it is without being smoothed by the torque change filter 67.

Part (H) of FIG. 6 is a chart illustrating a change of the fuel injection amount determined based on the final target torque. In Part (H) of FIG. 6, a horizontal axis indicates time and a vertical axis indicates the required injection amount. Further in Part (H), a dashed line indicates a required injection amount corresponding to the smoothed basic target torque illustrated in Part (F) and a solid line indicates a required injection amount corresponding to the final target torque illustrated in Part (G).

In the example of Part (H) of FIG. 6, the engine controlling module 69 controls, in the chronological change of the final target torque determined at S6, the chronological change corresponding to the torque reduction amount based on the fuel injection amount to be injected by the fuel injector 20. Therefore, as indicated by the solid line of Part (H), the required injection amount changes similarly to the chronological change of the final target torque illustrated in Part (G).

Part (I) of FIG. 6 is a chart illustrating, in the vehicle steered as illustrated in Part (B), a change of a yaw rate (actual yaw rate) which occurs in the vehicle when the engine E is controlled to achieve the final target torque illustrated in Part (G), and a change of an actual yaw rate when the control corresponding to the torque reduction amount illustrated in Part (E) of FIG. 6 is not performed (i.e., the engine E is controlled to achieve the smoothed basic target torque indicated by the dashed line in Part (G) of FIG. 6). In Part (I), a horizontal axis indicates time and a vertical axis indicates the yaw rate. Further in Part (I), a solid line indicates the change of the actual yaw rate when the engine E is controlled to achieve the final target torque and a dashed line indicates the change of the actual yaw rate when the control corresponding to the torque reduction amount is not performed.

When the rightward steering operation is started at the position A and the torque reduction amount is increased as illustrated in Part (E) of FIG. 6 as the rightward steering speed increases, a load on the front wheels (drive wheels) of the vehicle increases. As a result, a friction force between the front wheels and the road surface increases and a cornering force of the front wheels increases, and therefore, a turning performance of the vehicle improves. In other words, as illustrated in Part (I) of FIG. 6, the yaw rate in a clockwise direction (CW) which occurs in the vehicle between the positions A and B becomes higher in the case where the engine E is controlled to achieve the final target torque reflecting the torque reduction amount (solid line) compared to the case where the control corresponding to the torque reduction amount is not performed (dashed line).

Further as illustrated in Parts (D) and (E) of FIG. 6, when the steering speed toward the position B decreases, the target applied deceleration decreases, whereas the torque reduction amount is maintained at the highest value. Therefore, while the turning operation of the steering continues, the load on the front wheels is maintained and the turning performance of the vehicle is secured.

Moreover, if the absolute value of the steering angle is fixed between the positions B and C, since the torque reduction amount is smoothly reduced, the load on the front wheels is gradually reduced in response to the end of the turning operation of the steering and the cornering force of the front wheels is reduced, so as to resume an output torque of the engine E while stabilizing the vehicle body.

Next, a modification of this embodiment is described.

In the embodiment described above, the torque reduction amount determining module 63 acquires the target applied deceleration based on the steering speed and determines the torque reduction amount based on the target applied deceleration; however, the torque reduction amount may be determined based on the second operating state of the vehicle (the steering angle, the yaw rate, a slip rate, etc.).

For example, the torque reduction amount determining module 63 may calculate a target yaw acceleration to be produced in the vehicle based on a target yaw rate calculated based on the steering angle and the vehicle speed and a yaw rate inputted from a yaw rate sensor, and acquire the target applied deceleration based on the target yaw acceleration, so as to determine the torque reduction amount. Alternatively, a roll acceleration which occurs due to rolling of the vehicle may be detected by an acceleration sensor so as to determine the torque reduction amount based on the roll acceleration.

Further in the embodiment described above, in the chronological change of the final target torque, the chronological change corresponding to the torque reduction amount determined based on the steering operation is not smoothed by the torque change filter 67; however, the chronological change corresponding to the torque reduction amount may be smoothed in a smoothing degree lower than that of the chronological change corresponding to the basic target torque.

Specifically, in the embodiment described above, at S4 of FIG. 3, the torque change filter 67 only smooths the chronological change of the basic target torque determined at S3; however, additionally, after the torque reduction amount is determined at S29 in the torque reduction amount determination processing of FIG. 4, the chronological change of the torque reduction amount is smoothed. Here, the smoothing degree of the torque reduction amount is reduced to be lower than that of the basic target torque. In other words, the smoothing degree of the chronological change of the final target torque corresponding to the torque reduction amount is reduced to be lower than that of the chronological change of the final target torque corresponding to the basic target torque.

Further in the embodiment described above, the engine system 200 to which the control device for the engine is applied includes the engine E as the diesel engine; however, the engine system 200 may include a gasoline engine having an air amount controlling mechanism for controlling an amount of air introduced into a cylinder and an ignitor for igniting mixture gas within the cylinder. In this case, the engine controlling module 69 controls the air amount introduced into the cylinder by the air amount controlling mechanism (e.g., a throttle valve actuator or a variable valve mechanism) and/or controls an ignition timing by the ignitor.

Next, effects of the control device for the engine according to the above-described embodiment and modification of the present invention are described.

First, the torque change filter 67 reduces the smoothing degree of the chronological change of the final target torque corresponding to the torque reduction amount determined based on the second operating state of the vehicle, to be lower than the smoothing degree of the chronological change of the final target torque corresponding to the basic target torque determined based on the first operating state of the vehicle. Therefore, while a sharp change of the final target torque due to a sharp change of the first operating state is suppressed, the chronological change of the torque reduction amount determined based on the second operating state of the vehicle, without being smoothed excessively, is reflected in the chronological change of the final target torque. Thus, the engine E is controlled to obtain the torque reduction amount with high responsiveness in the second operating state of the vehicle, the load is promptly applied to the front wheels, and the vehicle behavior intended by the driver is accurately achieved.

Especially since the torque change filter 67 does not smooth the chronological change of the torque reduction amount (i.e., the chronological change of the final target torque corresponding to the torque reduction amount is not smoothed), while the sharp change of the final target torque due to the sharp change of the first operating state of the vehicle is suppressed, the chronological change of the torque reduction amount determined based on the second operating state of the vehicle is reflected in the chronological change of the final target torque as it is. Therefore, by controlling the engine E to obtain the torque reduction amount with highest responsiveness to the second operating state of the vehicle, the vehicle behavior intended by the driver is accurately achieved.

Further, since the torque reduction amount determining module 63 determines the torque reduction amount according to the steering operation of the vehicle, the chronological change of the torque reduction amount determined based on the steering operation, without being smoothed excessively, is reflected in the chronological change of the final target torque. Therefore, by promptly applied the deceleration corresponding to the steering operation by the driver on the vehicle to add the load on the front wheels so as to promptly increase the cornering force, the responsiveness to the steering operation is improved. Moreover, while the sharp change of the final target torque corresponding to the first operating state of the vehicle is suppressed, the engine E is controlled to accurately achieve the vehicle behavior intended by the driver.

Especially the torque reduction amount determining module 63 determines the torque reduction amount to be increased as the steering speed of the vehicle increases while the increase rate of the torque reduction amount becomes lower. Therefore, once the steering operation of the vehicle is started and the steering speed of the vehicle starts to increase, the torque reduction amount is promptly increased. Thus, the deceleration is promptly applied to the vehicle when the steering operation of the vehicle is started, and a sufficient load is promptly applied to the front wheels which are the drive wheels, which increases the friction force between the front wheels and the road surface and increases the cornering force of the front wheels. As a result, the turning performance of the vehicle in the start of entering a curve improves, and the responsiveness to the turning operation of the steering improves while suppressing the sharp change of the final target torque corresponding to the first operating state of the vehicle.

Further the basic target torque determining module 61 determines the target acceleration of the vehicle based on the first operating state of the vehicle and determines the basic target torque based on the target acceleration. Therefore, the engine E is controlled to accurately achieve acceleration intended by the driver while suppressing the sharp change of the final target torque corresponding to the first operating state of the vehicle.

Further, the control device for the engine is the control device for the diesel engine including the fuel injector for injecting the fuel into the cylinder, and the engine controlling module 69 controls the fuel injection amount of the fuel injector 20 so as to cause the diesel engine to output the final target torque. Therefore, by changing the fuel injection amount, the chronological change of the torque reduction amount determined based on the second operating state of the vehicle is accurately achieved with high responsiveness, and the engine E is controlled to accurately achieve the vehicle behavior intended by the driver.

Further, the control device for the engine is the control device for the gasoline engine including the air amount controlling mechanism for controlling the air amount introduced into the cylinder and the ignitor for igniting the mixture gas within the cylinder. The engine controlling module 69 controls at least one of the air amount introduced into the cylinder by the air amount controlling mechanism and the ignition timing by the ignitor, so as to cause the gasoline engine to output the final target torque. Therefore, by changing the air amount introduced into the cylinder and/or the ignition timing, the chronological change of the torque reduction amount determined based on the second operating state of the vehicle is accurately achieved with high responsiveness, and the engine E is controlled to accurately achieve the vehicle behavior intended by the driver.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Intake Passage
5 Turbocharger
5*a* Compressor
5*b* Turbine
5*c* Flap
20 Fuel Injector
41 Exhaust Passage
43 High-pressure EGR Device
48 Low-pressure EGR Device
60 PCM
61 Basic Target Torque Determining Module
63 Torque Reduction Amount Determining Module
65 Final Target Torque Determining Module
67 Torque Change Filter
69 Engine Controlling Module
200 Engine System
E Engine

What is claimed is:

1. A control device for controlling an engine based on an operating state of a vehicle, comprising a processor, and a memory storing software modules configured to be executed by the processor, the software modules comprising:
    a basic target torque determining module for determining a basic target torque based on an operating state of the vehicle including an operation of an accelerator pedal;
    a torque change smoothing module for smoothing a chronological change of the basic target torque before determining a final target torque;
    a torque reduction amount determining module for, in parallel to the determination of the basic target torque and the smoothing of the chronological change of the basic target torque, determining a torque reduction amount according to a steering operation of the vehicle, and as a vehicle steering speed increases, determining the torque reduction amount such that the torque reduction amount is increased and an increase rate at which the torque reduction amount is increased, decreases, wherein the torque reduction amount is not smoothed by the torque change smoothing module;
    a final target torque determining module for determining the final target torque based on the smoothed basic target torque and the torque reduction amount; and
    an engine controlling module for controlling the engine to output the final target torque.

2. The control device of claim 1, wherein the torque change smoothing module does not smooth the chronological change of the final target torque corresponding to the torque reduction amount.

3. The control device of claim 1, wherein the basic target torque determining module determines a target acceleration of the vehicle based on the operating state of the vehicle including the operation of the accelerator pedal, and determines the basic target torque based on the target acceleration.

4. The control device of claim 1, wherein the engine is a diesel engine including a fuel injector for injecting fuel into a cylinder, and wherein the engine controlling module controls a fuel injection amount of the fuel injector so as to cause the diesel engine to output the final target torque.

5. The control device of claim 1, wherein the engine is a gasoline engine including an air amount controlling mechanism for controlling an amount of air introduced into a cylinder, and an ignitor for igniting mixture gas within the cylinder, wherein the air amount controlling mechanism is a throttle valve actuator or a variable valve mechanism, and wherein the engine controlling module controls at least one of the air amount by the air amount controlling mechanism and an ignition timing by the ignitor, so as to cause the gasoline engine to output the final target torque.

\* \* \* \* \*